Dec. 5, 1950  C. L. HUSSEY ET AL  2,532,813
LAWN MOWER CONSTRUCTION
Filed Nov. 26, 1949  2 Sheets-Sheet 1
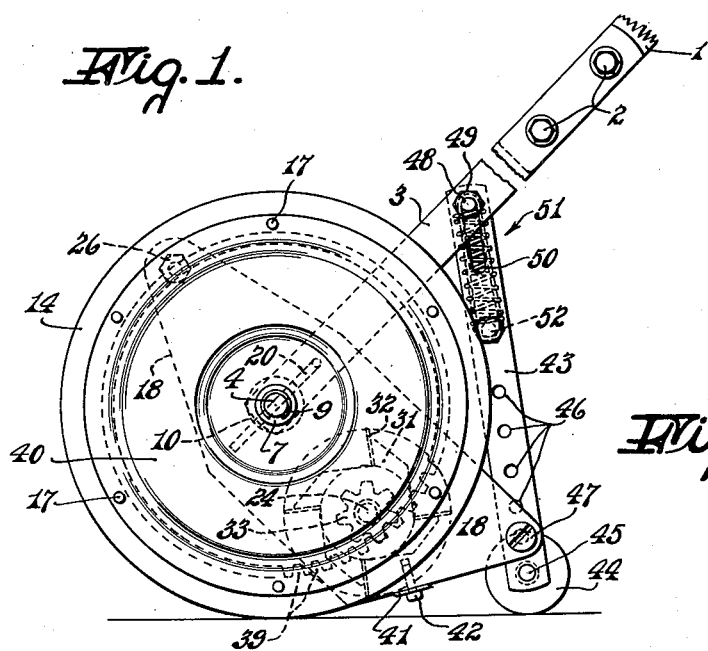
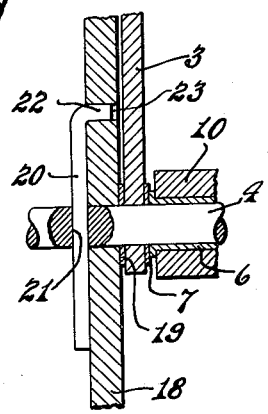
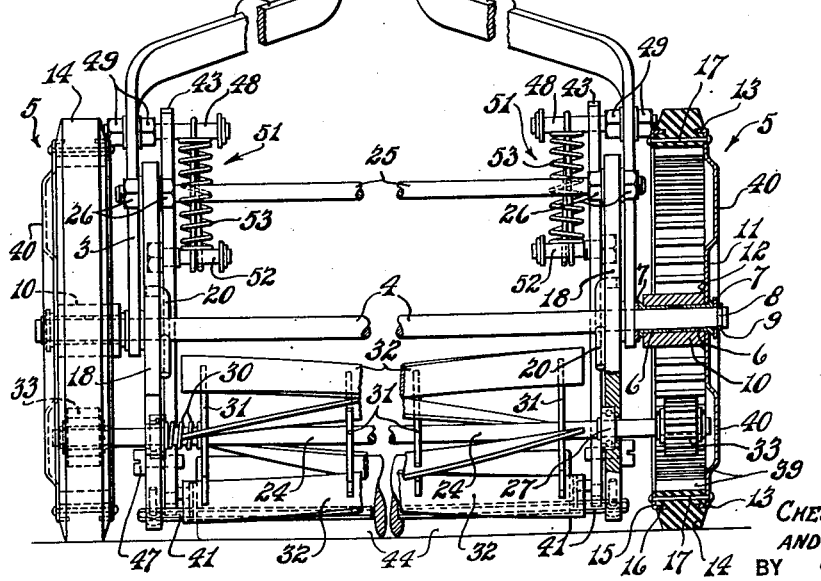
INVENTORS
CHESTER L. HUSSEY
AND FRANK T. GREEN
BY Chapin & Neal
ATTORNEYS Dec. 5, 1950　　C. L. HUSSEY ET AL　　2,532,813
LAWN MOWER CONSTRUCTION
Filed Nov. 26, 1949　　2 Sheets-Sheet 2
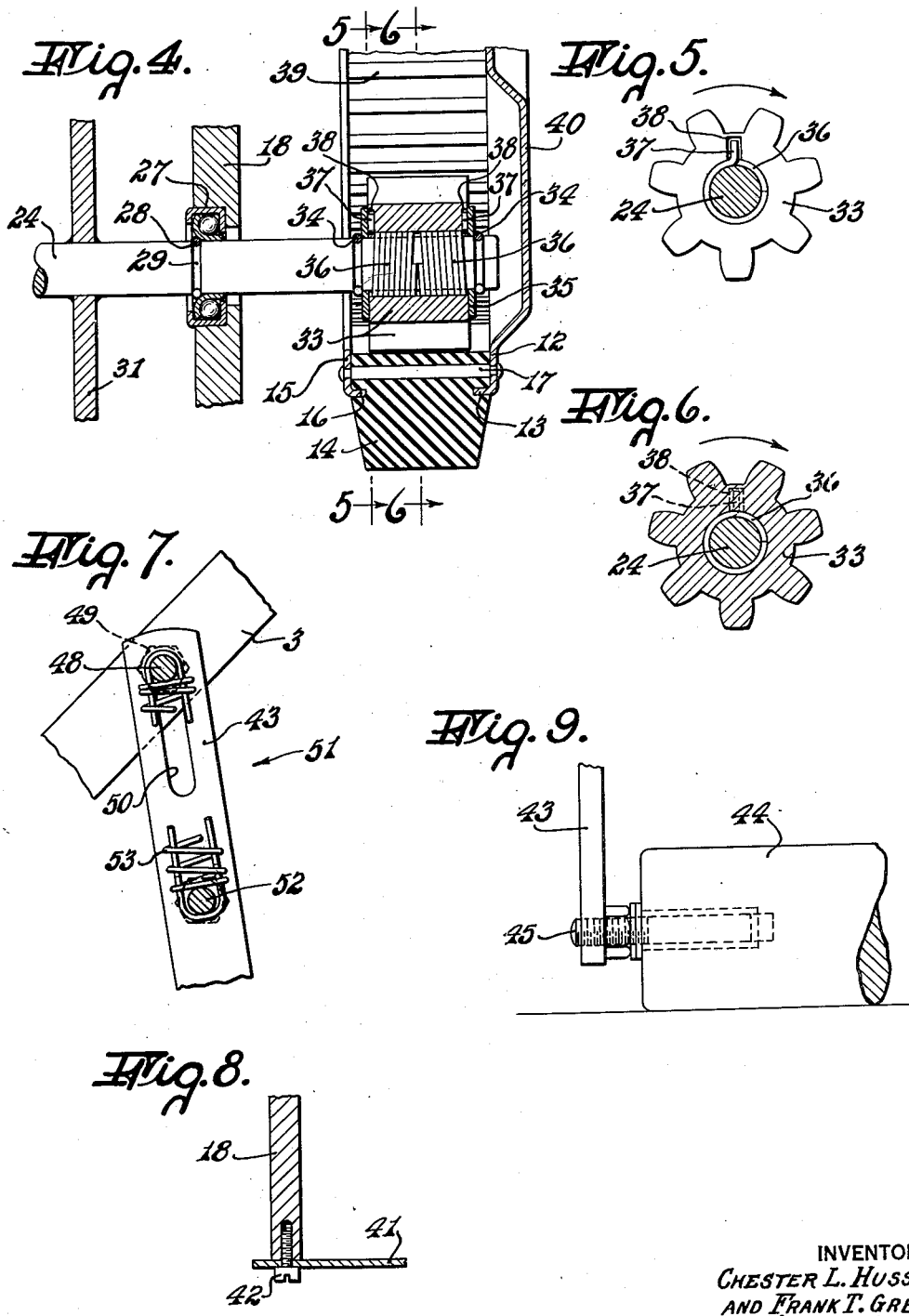
INVENTORS
CHESTER L. HUSSEY
AND FRANK T. GREEN
BY Chapin & Neal
ATTORNEYS Patented Dec. 5, 1950

2,532,813

UNITED STATES PATENT OFFICE 2,532,813

LAWN MOWER CONSTRUCTION

Chester L. Hussey, Belchertown, and Frank T. Green, Easthampton, Mass., assignors to Savage Arms Corporation, Utica, N. Y., a corporation of Delaware Application November 26, 1949, Serial No. 129,672

2 Claims. (Cl. 56—249)

This invention relates to lawn mowers and has for an object to provide a new and simplified lawn mower construction made largely of stamped metal parts and having a minimum of castings for economy in manufacture and lightness, efficiency and serviceability in use.

Another object is to provide a novel mounting assembly for the bed knife and reel carriage so that a more economical blade may be used, easily adjusted and replaced.

An additional object is to provide a wheel assembly with a novel tire mounting and spring clutch driving means for further purposes of economy and serviceability.

A still further object is to provide a simplified bracket assembly for adjustment of the cutting height of the mower and to serve as a shock absorber linkage for the handle when in operation.

Other objects and advantages will be apparent from the accompanying description and drawings, in which:

Fig. 1 is a side elevation of the mower assembly with the handle cut away to save space;

Fig. 2 is a front elevation with parts thereof in section;

Fig. 3 is a fragmentary detail of the side plate and axle assembly;

Fig. 4 is an enlarged detail to show the tire mounting and reel pinion gear drive construction;

Figs. 5 and 6 are views on lines 5——5 and 6——6 respectively of Fig. 4; and

Figs. 7, 8, and 9 are fragmentary views of various parts to show further details of construction.

The handle 1 is joined as by bolts 2 to two oppositely offset handle braces 3 which are mounted at their lower ends on a wheel axle 4. Wheels 5 are journaled on the ends of the axle and each wheel is mounted on two flanged bearing bushings 6 set between washers 7 holding the bushings in the hub of the wheel. Adjacent each extreme outer end of the axle 4 a transverse groove 8 is cut to receive a split snap ring 9 so as to retain each wheel assembly on the axle.

The wheel hub 10 carries a wheel disk 11 being joined thereto as by the welding indicated at 12. The outer periphery of the disk is provided with an inwardly turned flange 13 inset into the outer side wall of a tire 14. As shown, the tire is of hard rubberized or plastic material and on its inner side wall is provided with an inner metallic rim 15 with a flange 16 inset oppositely to flange 13 (Fig. 4). Rims 15 and the outer edge of the disk 12 are tied through the tire by spaced rivets 17.

Two side plates 18 are spaced on axle 4 and each is mounted inwardly of and adjacent a handle brace 3. A washer 19 separates each handle brace and side plate. A pair of pins or keys 20, each having a long arm passing through a hole 21 in axle 4 holds the plates in spaced relation on the axle. Each key 20 also holds the wheel parts mounted at each end portion of the axle between plate 18 and its end clamp ring 9. An upper end 22 of key 20 is turned and inserted at right angles into a hole 23 in the adjacent side plate, so as to secure the relative positioning of the plate and axle 4 and to prevent their rotation with respect to each other.

A front brace tie rod 25 having each end thereof threaded to receive tie rod nuts 26 joins the forward upper ends of side plates 18. The spacing of the said side plates may be adjusted by manipulation of the tie rod nuts 26 as will be explained.

In the lower portions of the plates is carried a reel shaft 24 and at 27 on each plate is a bearing assembly for journaling shaft 24 which passes through the plates (Fig. 4). The positioning of the reel is determined by a split ring 28 snapped in a groove 29 on the shaft at one side thereof (as at the right hand end when viewing the assembly as shown by Fig. 2) and a spring 30 adjacent the other side plate and placed between said plate and an adjacent spider 31 of the reel. Spring 30 presses the reel to bias the snap ring 28 against the bearing in the opposite side plate 18. Blades 32 are carried by the spaced spiders 31.

At each outer end of the reel shaft are mounted driving pinions 33 (see Fig. 4) rotatably mounted on the shaft between split rings 34 snapped in spaced grooves cut at each end of the shaft. Two washer plates 35 are mounted on each side of the pinion and wrapped around the shaft 24 for driving purposes are two oppositely wound coil springs 36. Upwardly turned outer ends 37 of springs 36 are provided for insertion into keeper notches 38 of the pinion.

As shown the inner surface of tire 14 is formed as a gear ring in mesh with the teeth of pinion gears 33. The tire and gear ring are formed as a single non-separable structural unit. As illustrated a hard rubber material is shown. Alternatively, a fibre ring gear might be molded with the tire into a single unit or the unit might be entirely of molded plastic substance.

The offset 40 in wheel disc 11 is provided for clearance of reel shaft 24 and to give structural rigidity to the wheel.

Springs 36 are wound oppositely to the direction of forward movement of the reel in the cutting operation. It will be noted by considering Figs. 5 and 6 that as the mower is pushed and the wheels rotate forwardly the tire will drive the pinion and reel clockwise in the direction of the arrows. This is by reason of the pinion gear winding the coiled springs 36 tightly on the shaft and clutching the same when the ends 37 are pushed forwardly in notches 38. When the pinions are driven by the wheel in a reverse direction the springs are loosened on the axle and the reel remains stationary as when the mower is backed up. This provides a one-way clutch operation for driving the reel only on forward movement of the wheels. A similar arrangement is provided for the pinion on the other end of the reel shaft.

A bed knife or cutter blade 41 is mounted on the lower edges of side plates 18 as by bolts 42 (see Figs. 1 and 8). The blade as here shown may be in the form of a relatively thin metal strip similar in construction to the common hacksaw blade. When so constructed it is flexible and when attached by the bolts it may then be stretched between the side plates to provide a relatively rigid plate for cutting operations with the rotatable reel. In the construction described the side plates 18 are keyed in fixed spaced relation on the axle 4 and the rearward and forward portions of said plates can be moved inwardly and outwardly of the assembly with the keys 20 acting as fulcrums for the pivoting action. Thus the blade 41 attached in place between the lower edges of the plates can be stretched between them by drawing together the upper forward end portions where joined by the front brace tie rod 25. The construction of the reel mounting assembly permits the necessary adjustment of the relative spacing between plates without affecting reel operation. The tie rod nuts 26 can be turned to provide the desired degree of tautness in cutter blade 41.

The easy disassembly and replacement of a cutter blade 41 is accomplished by loosening the front brace tie rod 25 and relaxing the tension of the blade between the plates. With an arrangement of this type a flexible blade of economical construction may easily be replaced with little effort and at small expense. In Fig. 1 a double edged blade is shown which enables its reversal to obtain a longer useful life in the machine. Inefficient cutting operations in the ordinary hand lawn mower are in large part due to a damaged cutter blade or the adjustment between it and the reel. In the construction shown a flexible blade automatically compensates for minor variations in adjustment. Being stretched between the plates 18 it is resilient and less subject to damage. If a major injury is suffered by the blade its replacement is easily made at a small expense compared with the loss of use and expense of sharpening and adjusting the mower. If desirable under certain operating conditions a rigid cutter blade may be mounted in the assembly.

Roller brackets 43 carried by the handle braces 3 and the side plates 18 are provided with a roller 44 mounted between the lower ends of the brackets on pins 45 (Fig. 9). Spaced holes 46 (Fig. 1) are provided in the brackets for the desired mounting of the side plates carrying the cutter reel and bed knife. The side plates at their lower rearward ends carry screw bolts 47 for insertion in any one of the holes 46.

At the top of each bracket 43 is carried a stud bolt 48 attached to handle brace 3 by stud nuts 49 (Fig. 7). The bolt 48 is received by the roller bracket 43 in an elongated slot 50 at the top of the bracket. The bolts 48 are inwardly faced (see Fig. 2) and carry one end of a shock absorber compression spring assembly 51. The other end of the assembly is mounted by a bolt 52 spaced on bracket 43. The spring as shown has wires looped around the bolts and encircled by the spring coils 53. This assembly provides a resilient mounting for the handle 1 and permits a relatively even pushing operation in spite of variations in the ground level. The wires joining the bolts within the coils 53 maintain the compression spring in position between said bolts.

Having described our invention, we claim:

1. A lawn mower having a frame including spaced handle braces, a wheel axle mounting said braces and provided at each end with wheels journaled thereon, spaced side plates on said axle between said braces, said plates having forward and rearward extensions, pins in said axle holding the plates in spaced relation against rotation on the axle and providing limited movement of the extensions toward and away from each other, a reel shaft journaled in the rearward extensions of said plates, a reel on the shaft and yieldable means for positioning the same between said plates, a bed knife mounted between the plates at the periphery of the reel and an adjustable tie rod joining the forward extensions of said plates for tightening and loosening said knife.

2. A lawn mower having a frame including a wheel axle provided with traction wheels supporting the same, spaced side plates mounted on said axle and having rearward and forward extensions, pins keyed to said axle and to said plates permitting limited movement of said extensions toward and away from each other, a flexible bed knife connecting the rearward extensions, a reel mounted therebetween, and an adjustable tie rod connecting the forward extensions for tightening and loosening said bed knife.

CHESTER L. HUSSEY.
FRANK T. GREEN.

REFERENCES CITED

The following references are of record in the file of this patent:

UNITED STATES PATENTS

| Number | Name | Date |
|---|---|---|
| 1,809,698 | Hessenbruch | June 9, 1931 |
| 2,197,264 | Cooper | Apr. 16, 1940 |
| 2,300,712 | Starkey | Nov. 3, 1942 |